(12) United States Patent
Nguyen et al.

(10) Patent No.: US 11,867,349 B2
(45) Date of Patent: Jan. 9, 2024

(54) SELF-BALANCING TWO-ROTATION DRIVING MECHANISM

(71) Applicant: VIETTEL GROUP, Ha Noi (VN)

(72) Inventors: Pham Tuan Nguyen, Ha Noi (VN); Kim Bao Le, Vinh Phuc Province (VN); Van Dinh Pham, Ha Noi (VN); Anh Tuan Cao, Ha Noi (VN); Quoc Toan Tran, Lai Chau Province (VN); Duy Tung Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/882,364

(22) Filed: Aug. 5, 2022

(65) Prior Publication Data
US 2023/0085799 A1    Mar. 23, 2023

(30) Foreign Application Priority Data

Sep. 23, 2021 (VN) .............................. 1-2021-05941

(51) Int. Cl.
| | |
|---|---|
| *F16M 11/12* | (2006.01) |
| *F16M 11/18* | (2006.01) |
| *F16M 11/22* | (2006.01) |
| *B64C 39/02* | (2023.01) |

(52) U.S. Cl.
CPC ........... *F16M 11/126* (2013.01); *F16M 11/18* (2013.01); *F16M 11/22* (2013.01); *B64C 39/024* (2013.01)

(58) Field of Classification Search
CPC ...... F16M 11/126; F16M 11/18; F16M 11/22; B64C 39/024; B64U 20/87

USPC .............................. 248/682, 550, 418, 349.1
See application file for complete search history.

(56) References Cited

U.S. PATENT DOCUMENTS

| | | | | |
|---|---|---|---|---|
| 4,490,724 | A * | 12/1984 | Bickman | F16M 11/18 343/765 |
| 5,598,207 | A * | 1/1997 | Kormos | F16M 11/18 348/148 |
| 5,729,016 | A * | 3/1998 | Klapper | G02B 23/12 348/148 |
| 7,223,063 | B2 * | 5/2007 | Jonas | F16M 11/18 414/774 |
| 8,844,896 | B2 * | 9/2014 | Pettersson | G03B 15/006 248/646 |
| 2017/0048439 | A1 * | 2/2017 | von Borcke-Morawitz | G03B 15/006 |
| 2022/0174189 | A1 * | 6/2022 | Kuo | H02K 41/0356 |

* cited by examiner

*Primary Examiner* — Muhammad Ijaz
(74) *Attorney, Agent, or Firm* — patenttm.us

(57) ABSTRACT

A self-balancing Two-Rotation Driving Mechanism (TRDM) uses parallelogram and has low weight, high load, high accuracy, quick response and good adaptation with multi equipment. A longitudinal rotation motor assembly is constrained fully with a base assembly and drives a longitudinal rotation assembly through connecting rod parallelogram. The lateral rotation motor assembly is assembled in the hub of a longitudinal rotation assembly and rotates an equipment clamping assembly in a lateral direction. Generally, the TRDM can drive equipment clamping assembly in two rotations, with longitudinal rotation in the range of ±45° and lateral rotation in range of ±20°. A rotation limitation is reached when limitation shafts touch the end of respective grooves.

2 Claims, 6 Drawing Sheets

SELF-BALANCING TWO-ROTATION DRIVING MECHANISM

SCOPE OF THE INVENTION

This self-balancing Two-Rotation Driving Mechanism (TRDM) can be applied for navigation or space observation systems such as unmanned aerial vehicle (UAV), reconnaissance equipment, missiles.

GENERAL DESCRIPTION

The development of UAV, reconnaissance equipment or missiles requires a flexible driving mechanism for radar, camera or target detector. These equipment need a self balancing anti vibration mechanism to ensure imagine and direction stability. There are some methods with different advantages for this issue.

In case of self-balancing mechanism with mechanical anti vibration, balance weights are used simply. However, balancing adjustment ability is limited, especially for multi object systems.

In case of self-balancing mechanism with electronic anti vibration, the sophisticated structure with controlled board and actuators are not ensured for harsh working conditions or simple maintenance.

To overcome these problems, the invention of TRDM using connecting rod parallelogram is applied. Using this parallelogram with brushless motor and angular sensor in output shaft improves the accuracy and stability, especially in harsh working environment.

SUMMARY OF THE INVENTION

This invention provides a TRDM using parallelogram which has low weight, high load, high accuracy, quick response and good adaptation with multi equipment.

The structure of this mechanism includes (referred to FIG. 1): Base assembly (1), longitudinal rotation motor assembly (2), connecting rod parallelogram (3), longitudinal rotation assembly (4), lateral rotation motor assembly (5), equipment clamping assembly (6). Base assembly (1) can be fixed inside the aerial vehicle body. Longitudinal rotation motor assembly (2) is constrained fully with base assembly (1) and drives longitudinal rotation assembly (4) through connecting rod parallelogram (3). Lateral rotation motor assembly (5) is assembled in the hub of longitudinal rotation assembly (4) and rotates equipment clamping assembly (6) in lateral direction. Generally, TRDM can drive clamping assembly (6) in two rotations (referred to FIG. 6): Longitudinal rotation in range of ±45° and lateral rotation in range of ±20°. The rotation limitation is reached when limitation shafts touch the end of respective grooves.

DETAILED DESCRIPTION

Figure 1:
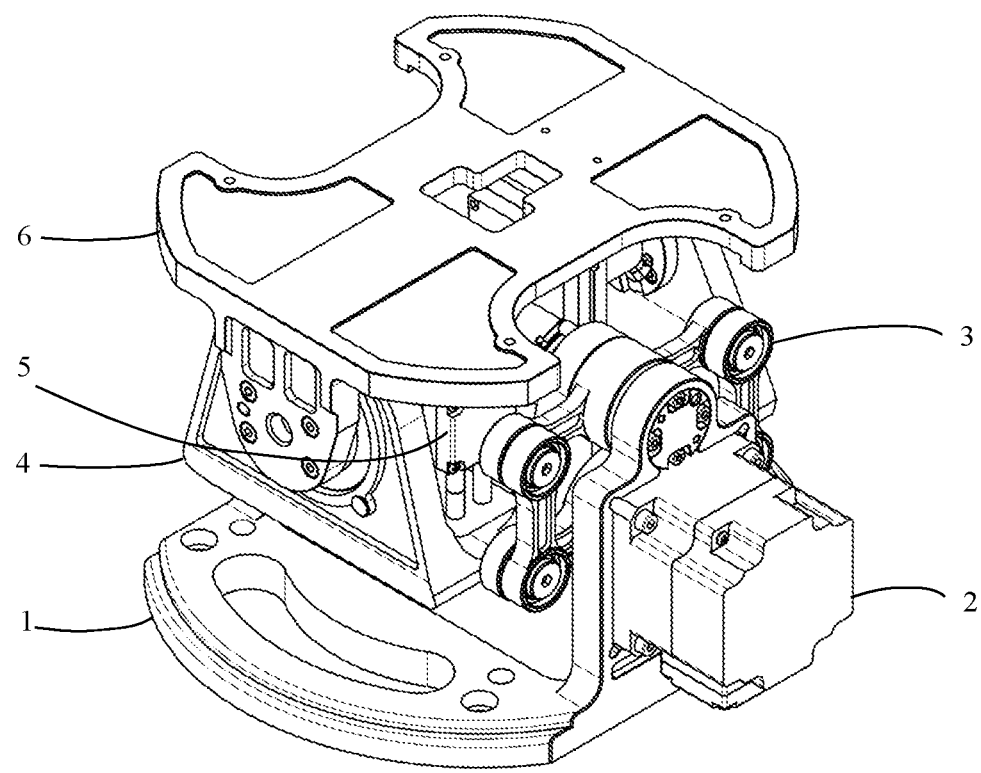
FIG. 1 is a perspective view of TRDM.
Figure 2:
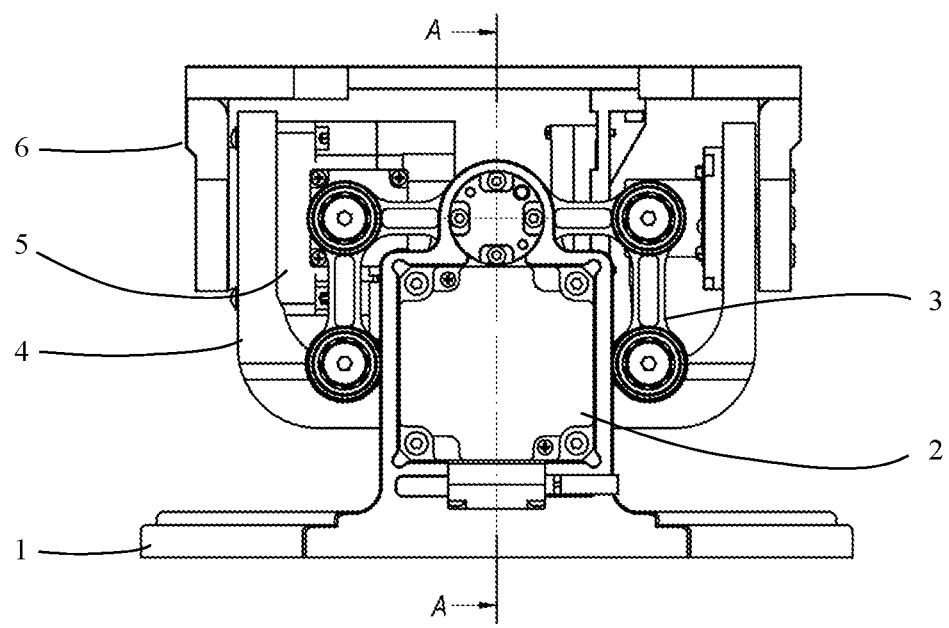
FIG. 2 is a right side view of TRDM.
Figure 3:
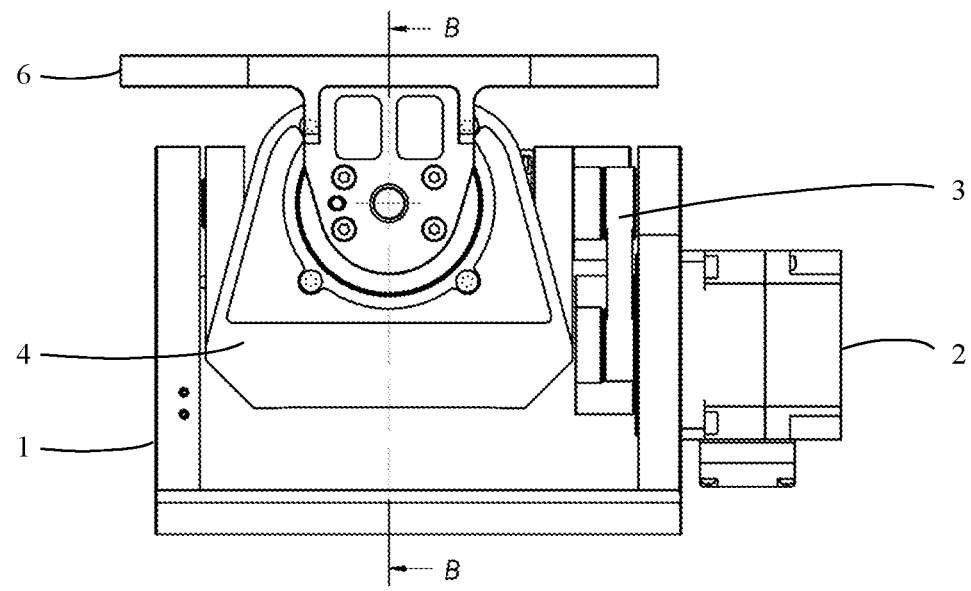
FIG. 3 is a front side view of TRDM.
Figure 4:
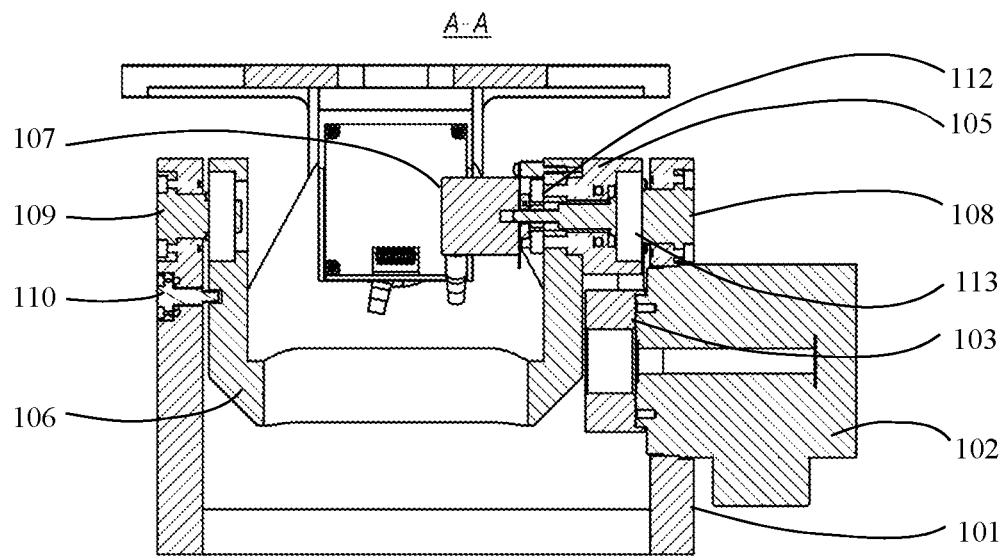
FIG. 4 is a cross section of TRDM taken along line A-A of FIG. 2.
Figure 5:
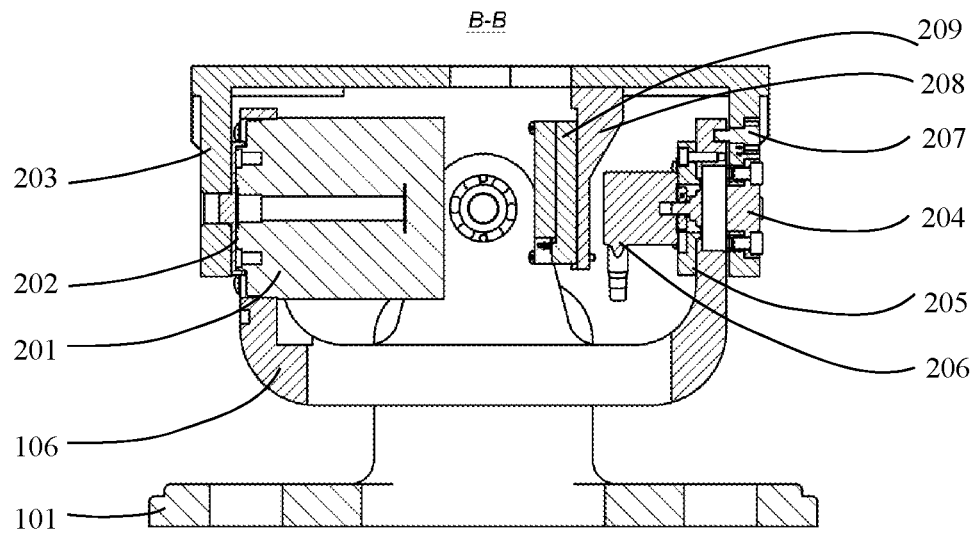
FIG. 5 is a cross section of TRDM taken along line B-B of FIG. 3.
Figure 6:
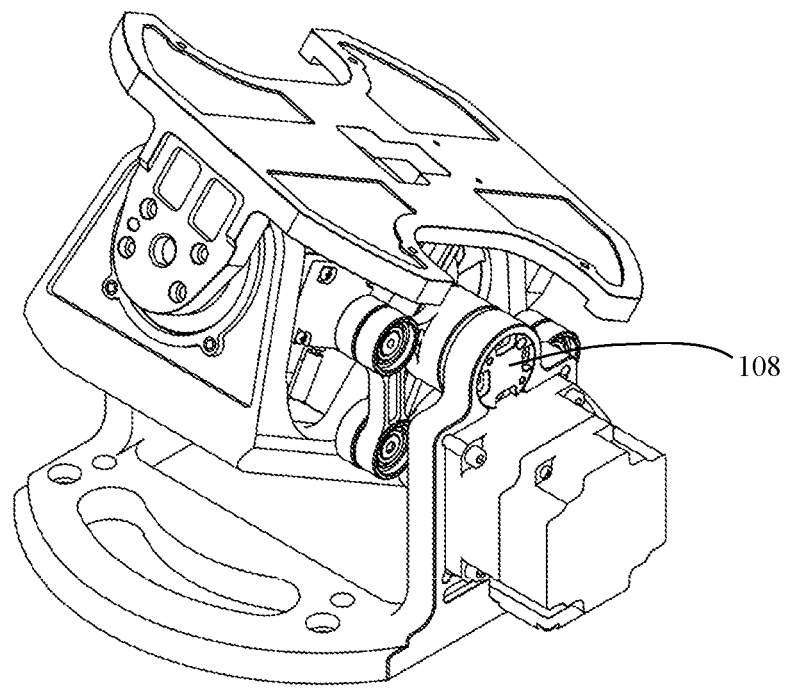
FIG. 6 is a perspective view of TRDM at longitudinal angle of +20° and lateral angle of +10°.
Figure 7:
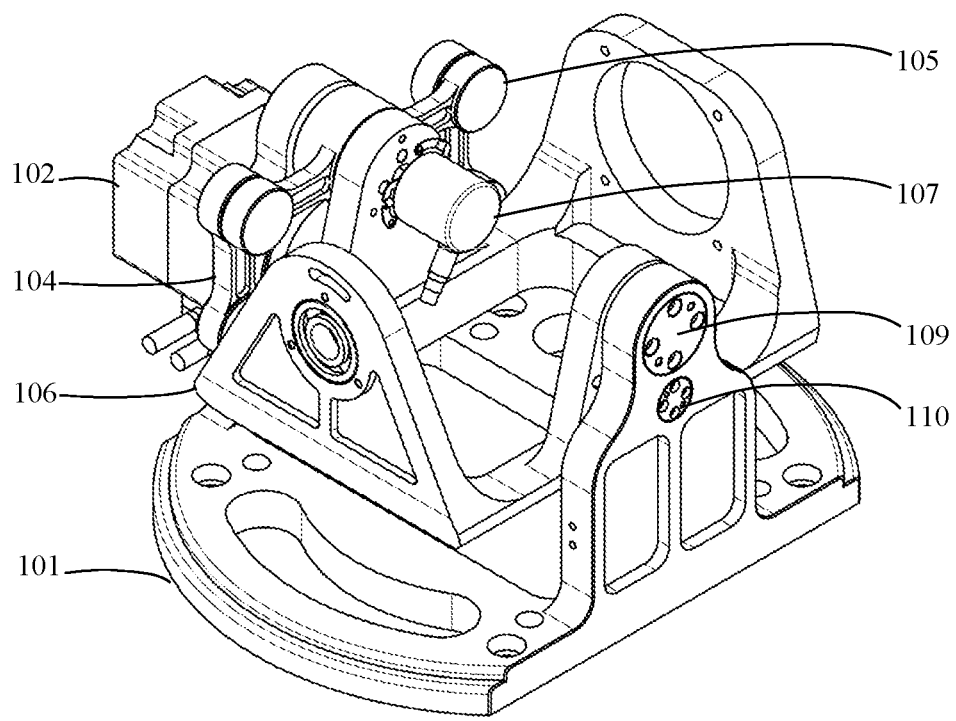
FIG. 7 is a full driving mechanism for longitudinal rotation.
Figure 8:
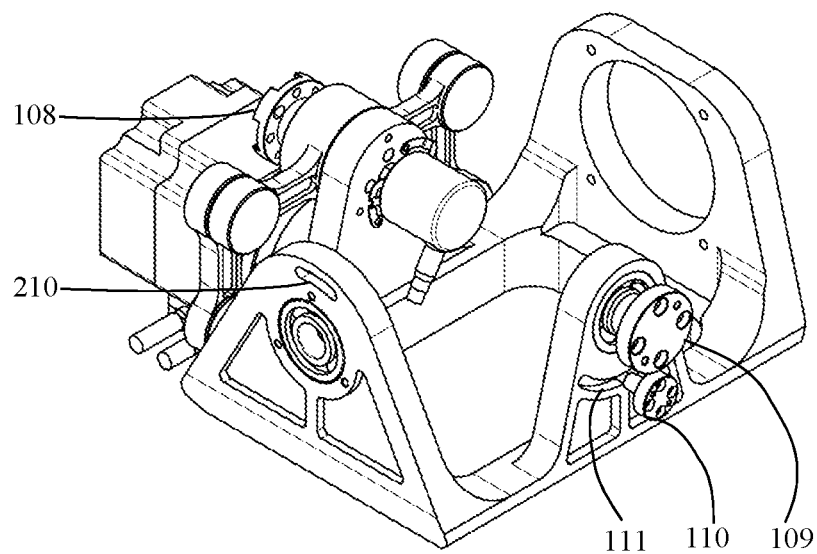
FIG. 8 is a driving mechanism for longitudinal rotation without base frame.
Figure 9:
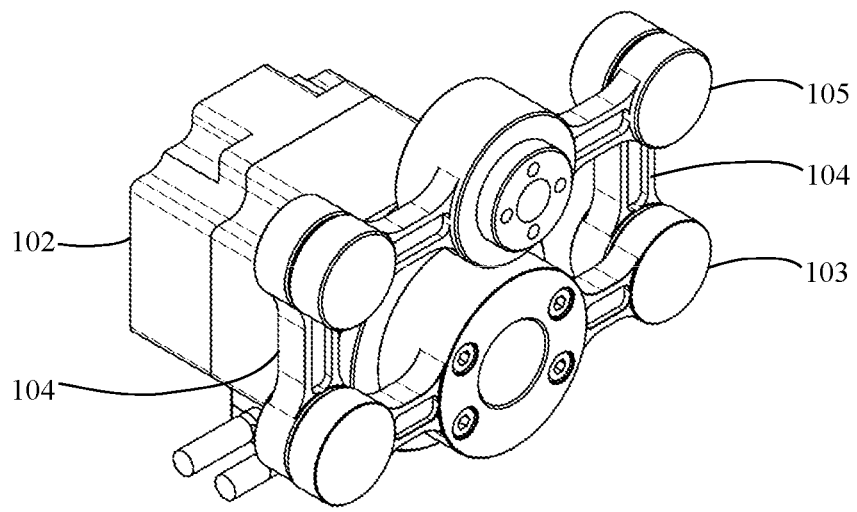
FIG. 9 is a connecting rod parallelogram driven by motor.
Figure 10:
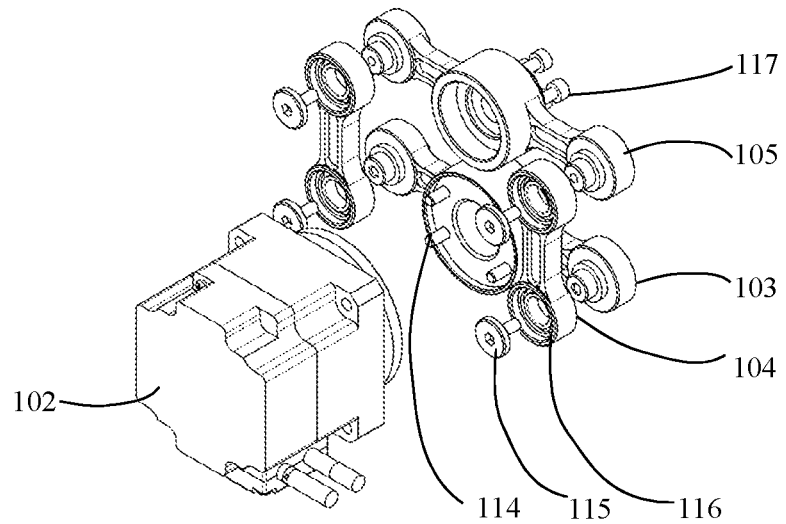
FIG. 10 is the assembling of connecting rod parallelogram.
Figure 11:
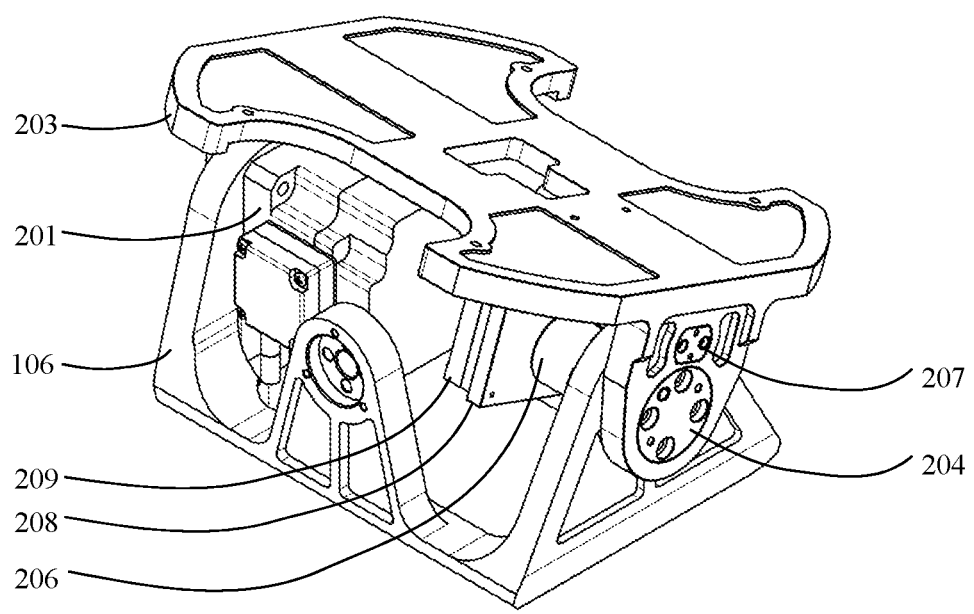
FIG. 11 is a perspective view of driving mechanism for lateral rotation angle of −10°.

Base frame (101) includes locating pin hole and bolt hole to be assembled in the aerial vehicle body. Hubs on the walls of base frame (101) are designed to assemble longitudinal rotation motor (102), first longitudinal rotation shaft (108), second longitudinal rotation shaft (109), longitudinal rotating limitation pin (110). Longitudinal rotation frame (106) is hung on the first and second longitudinal rotation shafts (108 and 109) with a couple of bearings (113) and connects with upper twin connecting rod (105) by bolts (112). Longitudinal rotation angle sensor (107) is connected directly with longitudinal rotation frame (106). Longitudinal rotation limitation pin (110) goes in the groove (111) on the longitudinal rotation frame (106) in order to limit the rotation of the longitudinal rotation frame (106).

The shafts (108 and 109) are designed with multi sections in order to push into the hub on the base frame wall (101) and be tightened by bolts from outside. This design can ensure the ease of maintenance process.

The solid body of base frame (101) offers good manufacturing process and stability. Longitudinal rotation motor (102) generates torque and transfers to lower twin connecting rod (103), then to both of single connecting rod (104); both of single connecting rod (104) drive upper twin connecting rod (105). These connecting rods work as parallelogram to increase the system stability when transferring torque from motor (102) to the longitudinal rotation frame (106).

The lower twin connecting rod (103) is designed with a hub in middle to fix with the output ring of longitudinal rotation motor (102) and be tightened by bolts (114).

Equipment clamping assembly (6) includes clamping part (203), gyroscope sensor hub (208), gyroscope sensor (209). Clamping part (203) is driven by lateral rotation motor (201) through transferring plate (202) and is hung on shaft (204) to rotate laterally. Lateral rotation motor (201) is assembled with longitudinal rotation frame (106) from inside by bolts. Clamping part (203) can be used to assemble antenna, photo sensor or observation camera. The lateral rotating limitation pin (207) is fixed with the wall of clamping part (203) and goes into the groove (210) on the longitudinal rotation frame (106).

TRDM can drive clamping part (203) in two rotations: Longitudinal rotation in range of ±45° and lateral rotation in range of ±20°. The rotation limitation is reached mechanically when limitation pins touch the ends of respective grooves.

Generally, each rotation is performed by respective motor and exact rotation angle is measured by the angular sensor. The rotation angle and rotation speed is controlled electronically by the control unit. The mechanical rotation limitations are used to prevent crash and control loss.

The invention claimed is:
1. A self-balancing two-rotation driving mechanism combining longitudinal and lateral rotation which can control each rotation independently, comprising;
a longitudinal rotation motor for driving longitudinal rotation, said longitudinal rotation motor is fixed in a hub of a base frame and motor torque is transferred through a parallelogram to a longitudinal rotation frame;

the base frame has walls and plural hubs are provided on the walls of the base frame assemble the longitudinal rotation motor, a first longitudinal rotation shaft, and a second longitudinal rotation shaft which are concentric;

the longitudinal rotation frame is hung on the first and second longitudinal rotation shafts with a couple of bearings and connects with an upper twin connecting rod by bolts;

a longitudinal rotation angle sensor is connected directly with the longitudinal rotation frame;

a longitudinal rotation limitation pin is fixed in a wall of the base frame and goes in groove on the longitudinal rotation frame in order to set a rotation limitation of the longitudinal rotation frame;

the first and second longitudinal rotation shafts are designed with multi sections in order to push into the hubs on the wall of the base frame and be tightened by bolts from outside;

the longitudinal rotation motor generates torque and transfers to a lower twin connecting rod, then to two of single connecting rod; both of the single connecting rods drive upper twin connecting rod; these connecting rods work as parallelogram to increase the stability when transferring torque from said longitudinal rotation motor to the longitudinal rotation frame;

the lower twin connecting rod comprises a hub in a middle to fix with an output ring of longitudinal rotation motor and be tightened by first and second bolts.

2. A lateral rotation assembly set on a longitudinal rotation frame having grooves: wherein lateral rotation is driven from a lateral rotation motor fixed on the longitudinal rotation frame to an equipment clamping assembly;

the equipment clamping assembly includes a clamping part having walls, a gyroscope sensor hub, and a gyroscope sensor;

the clamping part is driven by the lateral rotation motor through a transferring plate and is hung on a shaft to rotate laterally;

the lateral rotation motor is assembled with the longitudinal rotation frame from inside by bolts;

a respective lateral rotating limitation pin is fixed with a wall of the clamping part and goes into the respective grooves on the longitudinal rotation frame; a rotation limitation is reached mechanically when limitation pins touch the ends of said respective grooves; and rotation is performed by the lateral rotation motor and an exact rotation angle is measured by an angular sensor; the rotation angle and a rotation speed is controlled electronically by a control unit; said lateral rotating limitation pins are used to prevent crash and control loss.

* * * * *